United States Patent [19]

Shimakata et al.

[11] Patent Number: 5,097,220
[45] Date of Patent: Mar. 17, 1992

[54] CIRCUIT FOR DEMODULATING PSK MODULATED SIGNAL BY DIFFERENTIAL-DEFECTION

[75] Inventors: Yukihiro Shimakata; Kazutoshi Kubo, both of Tokyo, Japan

[73] Assignee: Japan Radio, Inc., Tokyo, Japan

[21] Appl. No.: 673,336

[22] Filed: Mar. 22, 1991

[30] Foreign Application Priority Data

Mar. 24, 1990 [JP] Japan .................................. 2-74198

[51] Int. Cl.[5] .............................................. H03D 3/18
[52] U.S. Cl. .................................... 329/306; 329/310; 375/82; 375/85
[58] Field of Search ............... 329/304, 306, 307, 308, 329/309, 310; 375/52, 53, 54, 55, 56, 57, 80, 83, 84, 85, 86, 87

[56] References Cited

U.S. PATENT DOCUMENTS

| 4,879,728 | 11/1989 | Tarallo | 329/306 X |
| 4,912,422 | 3/1990 | Kobayashi et al. | 329/306 |
| 4,959,619 | 9/1990 | Delacroix et al. | 329/310 X |

*Primary Examiner*—David Mis
*Attorney, Agent, or Firm*—Oliff & Berridge

[57] ABSTRACT

In a demodulator circuit which is simple in construction, a PSK modulated signal is converted in frequency into a quasi-base band signal and is then subjected to complex separation. Partly since a phase angle sampled from a digital complex signal is supplied to a differential-detector circuit, and partly since the differential-detector circuit processes only the phase angle, the differential-detector circuit has a simple construction. As the detected phase difference between two successive symbol data, an error between a carrier wave contained in the modulated signal and a locally oscillated frequency on the receiving side is compensated and is outputted as a digital demodulated signal.

5 Claims, 4 Drawing Sheets

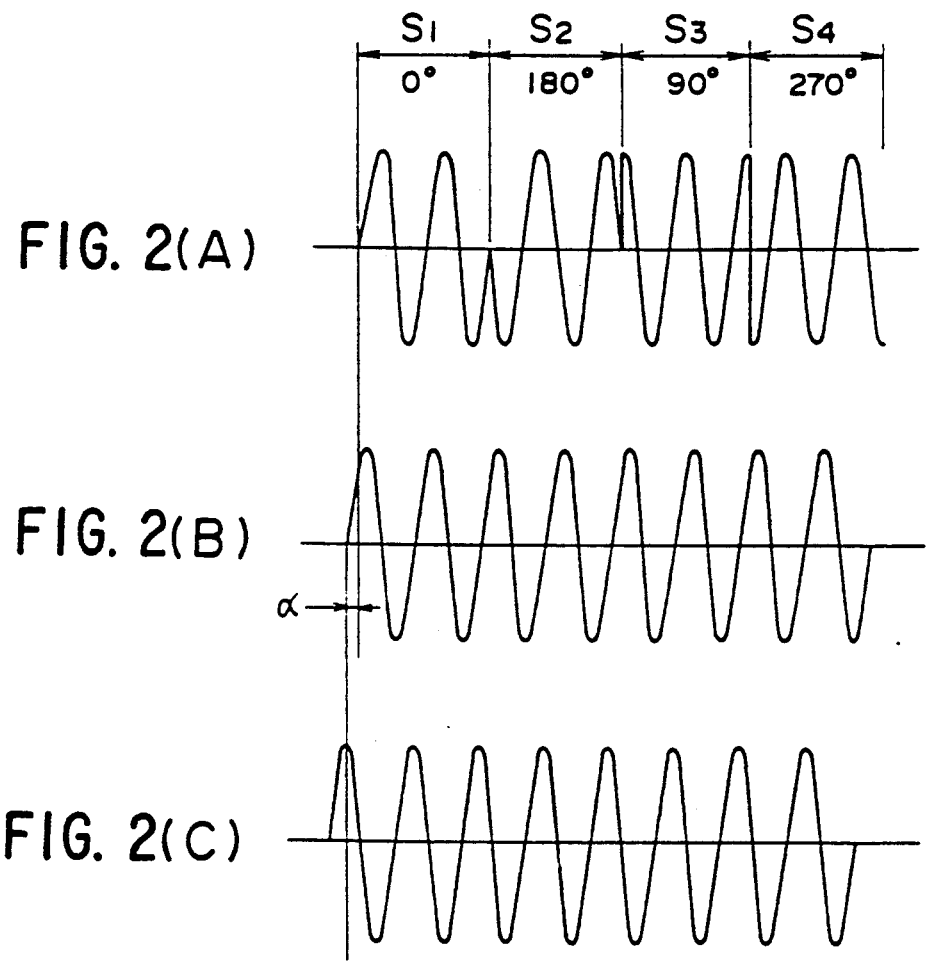
FIG. 2(A)
FIG. 2(B)
FIG. 2(C)
FIG. 3
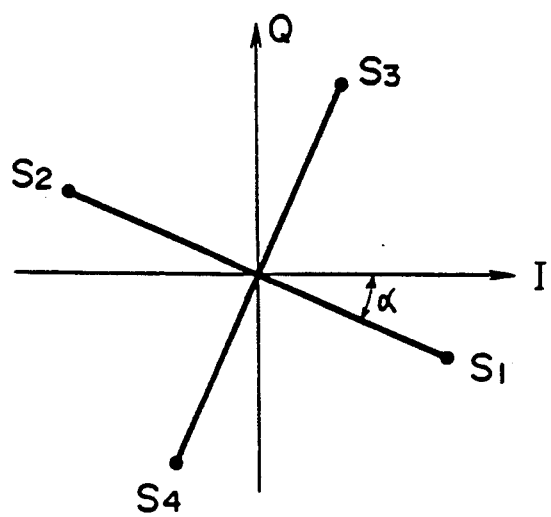

$\theta_F = \theta_n - \theta_{n-1}$

CIRCUIT FOR DEMODULATING PSK MODULATED SIGNAL BY DIFFERENTIAL-DEFECTION

BACKGROUND OF THE INVENTION

1. Field of the Invention

This invention relates generally to a circuit for demodulating a PSK modulated signal by differential-detection, and more particularly to such a circuit for obtaining a desired demodulated signal by converting in frequency an analog PSK modulated signal into a quasi-base band, by converting the quasi-base band signal into a digital complex signal and then by differential-detecting the digital complex signal.

2. Description of the Related Art:

Phase shift keying (PSK) is known as a typical digital modulation; if the phase of a carrier wave is changed to multiple phases (e.g., quadruple phase), then a modulated signal suitable for data transmission can be obtained.

For demodulating such a PSK modulated signal, it is currently known to convert in frequency into a quasi-base band and then to differential-detect a digital complex signal in the quasi-base band.

According to this quasi-base band frequency conversion, it is advantageous in that no accurate coincidence between a carrier frequency of the modulated signal and a local oscillation frequency generated in a receiver. This frequency difference is compensated by a subsequent phase error compensator to enable an accurate base band demodulation.

In this conventional demodulation, however, since the PSK modulated signal is processed as a digital complex signal, it requires a complicate demodulator circuit. Specifically, the circuit for differential-detecting the digital complex signal must be remarkably complicate. In addition, compensating an error of this differential-detected signal would also require a complicate circuit.

More specifically, the conventional demodulation system would encounter the following problems:

(1) Since a complex-multiplier is used, it would make the entire circuit complicate; to realize a countermeasure by hardware makes the entire circuit large in size. With the current technology level, assuming that a single complex-multiplier is constituted by general TTL integrated circuits for processing 8×8-bit complex data, it requires about forty integrated circuits. To constitute the complex-multiplier by specified integrated circuits, it still requires four such integrated circuits having a surface size of about 30 mm×80 mm.

(2) In the case of a power-saving-type digital signal processor (DSP) is used instead of the complex-multiplier, it consumes a relatively large amount of power and leads a difficulty in a high-speed demodulation. With the current technology level, when processing complex data similar to those of (1) above, the power consumption would be about 500 mW and the rate of demodulatable transmission of QPSK (Quadrature-Phase-Shift-Keying) would be about 256 kbps.

SUMMARY OF THE INVENTION

It is therefore an object of this invention to provide an improved demodulator circuit in which a PSK modulated signal is converted in frequency into a quasi-base band signal and this quasi-base band signal is then differential-detected by a differential-detector circuit and a phase error compensator circuit which are simple in construction.

According to the invention, there is provided a circuit for demodulating a PSK modulated signal by differential-detection, comprising: a pair of mixers for mixing the PSK modulated signal with a pair of locally oscillated signals of different phases to perform both frequency conversion to a quasi-base band and complex separation; an analog to digital converter for converting the outputs of the mixers into a digital complex signal; a phase angle processor for processing phase angles from the converted digital complex signal; a differential-detector for outputting differential phase angle data between successive symbols outputted from the phase angle processor; a phase error compensator for compensating a phase error contained in the differential phase angle data; and a decision circuit for outputting a demodulated digital signal from the compensated differential phase angle data.

With this demodulator, partly since the digital complex signal converted into a quasi-base band is once processed into a phase angle signal, and partly since differential detection and phase-error compensation take place by utilizing this phase angle signal it is possible to simplify the circuit components including multiplier or the like with respect to the complicate conventional circuits.

The manner in which a quadru-phase PSK is differential-detected will now be described by way of illustrated example.

On the transmitting side, the quadru-phase PSK is modulated by string data that are differential-encoded by a gray code. On the receiving side, demodulation is performed by detecting how many degrees the phase angle of N-th symbol has angularly moved through from the (N−1)th symbol between two successive symbols. The relationship between the angular movement of the phase angle and the demodulated string data (I, Q) is such that, for example, when the angular movement of the phase angle is 0 degrees, the demodulated string data (0, 0); when 90 degrees, (1, 0); when 180 degrees, (1, 1); and when 270 degrees, (0, 1).

The above and other advantages, features and additional objects of this invention will be manifest to those versed in the art upon making reference to the following detailed description and the accompanying drawings in which a preferred embodiment incorporating the principles of this invention is shown by way of illustrative example.

BRIEF DESCRIPTION OF THE DRAWINGS

FIGS. 2(A) through 2(C) are waveform diagrams showing typical quadru-phase PSK modulated signals and oscillatory signals of a typical local oscillator located in the demodulator;

FIG. 3 is a diagram showing on a complex plane input signals to an analog to digital converter of FIG. 1;

DETAILED DESCRIPTION

Figure 1:
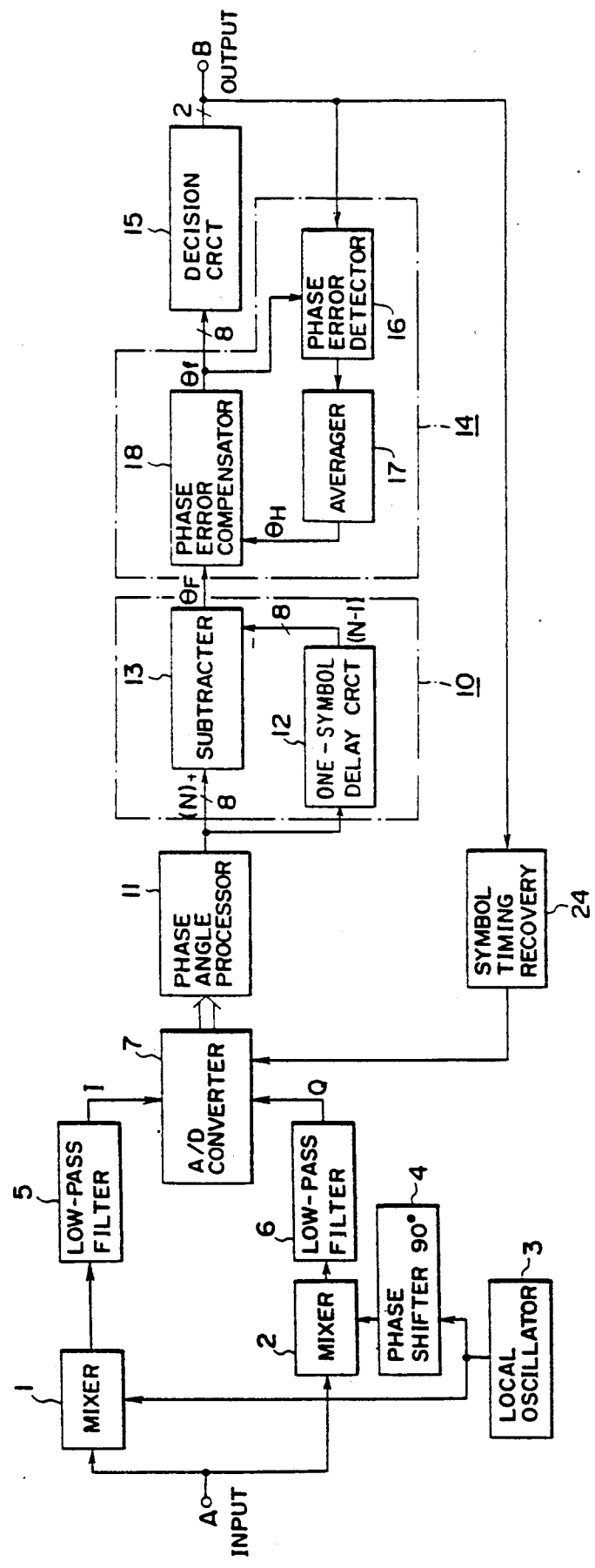
FIG. 1 is a block diagram showing a demodulator with a differential-detector embodying this invention.

The principles of this invention are particularly useful when embodied in a demodulator circuit such as shown in FIG. 1.

In FIG. 1, a PSK modulated signal (described below) is inputted to an input terminal A, and a local oscillator 3 is provided to generate a local oscillatory signal for converting a carrier wave of this modulated signal in frequency into a quasi-base band. This local oscillatory signal is mixed with the modulated signal to perform frequency conversion to a quasi-base band. In this embodiment, for processing a phase of the PSK modulated signal, the modulated signal is complex-separated into an in-phase (I-phase) signal and a quadrature-phase (Q-phase) signal by two mixers 1, 2, respectively. This complex separation is known in the art; the local oscillatory signal of the local oscillator 3 is supplied to the input of one of the mixers 1 as it is, while the local oscillatory signal is shifted in phase by 90 degrees by a phase shifter 4 and is then supplied to the input of the other mixer 2. In other words, the outputs of the two mixers 1, 2 are complex-separated into the I-phase of 0 degrees and the Q-phase of 90 degrees, respectively.

After receiving the harmonics in the outputs of the two mixers 1, 2 through low-pass filters 5, 6 respectively, the outputs thereof are supplied to an analog to digital (A-D) convertor 7 where the analog signals are converted into digital signals. The signals of both the I-phase and the Q-phase are sampled in the A-D convertor 7 at a timing which is controlled by a symbol timing recovery circuit 24.

The feature of this invention is that the output of the A-D converter 7 is processed to obtain a corresponding phase angle data by a phase angle processor 11.

As is apparent from FIG. 1, the output of the A-D converter 7 is complex signals of I and Q-phases. These complex signals are converted into phase angle data by the phase angle processor 11 so that subsequent differential-detection and phase error compensation are remarkably simplified.

In FIG. 1, the output of the phase angle processor 11 is supplied to a differential-detector 10, namely, the phase angle data are supplied to a subtracter 13 where subtraction between this N-th data and the right preceding (N−1)th data is performed by the subtracter 13.

Thus a phase difference $\theta_F$ is outputted in a differential-detector 10. This phase difference $\theta_F$ is then supplied to a decision circuit 15 via a phase error compensator 14.

The phase error compensator 14 compensates a difference occurred between the carrier frequency of the transmitting side and the local oscillatory frequency of the receiving side during conversion into a quasi-base band.

The phase error compensator 14 includes a phase error compensating circuit 18, a phase error detector 16, and an averager circuit 17.

The phase difference data whose phase error is compensated is decided by the decision circuit 15 and is outputted from an output terminal B of the decision circuit 15.

In operation, a modulated signal on the input terminal A is applied in parallel to one input of each mixer 1, 2 respectively, and at the same time, the output of the local oscillator 3 is applied directly to the other input of the mixer 1 while the output of the local oscillator 3 is shifted in phase by 90 degrees by the phase shifter 4 and is applied directly to the other input of the mixer 2. The modulated signal is accordingly converted in frequency into a quasi-base band.

FIGS. 2(A), 2(B) and 2(C) respectively shows the PSK modulated signal, a local oscillatory signal, and a local oscillatory signal shifted in phase by 90 degrees.

According to the example of FIGS. 2(A) through 2(C), the PSK modulated signal is composed of quadruphase modulated signals which are inputted in the order of symbols $S_1$, $S_2$, $S_3$ and $S_4$ and having different phases 0°, 180°, 90° and 270°.

The outputs of the two mixers 1, 2 are applied to the respective low-pass filters 5, 6 where their harmonics components are removed. The outputs of the low-pass filters 5, 6 are converted into digital complex data in the A-D converter 7.

The two mixers 1, 2 separate the respective modulated signals into an I-phase and a Q-phase and supply them to the A-D converter 7. At that time the quadruphase PSK signals of FIGS. 2(A), 2(B) and 2(C) are illustrated as $S_1$, $S_2$, $S_3$ and $S_4$, respectively, on the I and Q-phases in FIG. 3.

In FIG. 3, the phase of the local oscillator 3 has a leading angle of $\alpha$ from the phase of the PSK modulated signal.

The modulated data of the A-D converter 7 is processed into phase angle data by the phase angle processor 11. Subsequent processes are performed by using the phase angle data.

Specifically, the phase angle data obtained from the phase angle processor 11 is applied to one input of the subtracter 13, and at the same time, this phase angle data is delayed by one symbol by a one-symbol delay circuit 12 and is then applied to the other input of the subtracter 13. Therefore, the signals to be inputted to the subtracter 13 are two successive signals. The subtractor 13 outputs a phase difference $\theta_F$ between the two successive signals. This phase difference includes a phase error component due to the difference between the carrier frequency of the transmitting side and the frequency of the receiving side, and the phase error is compensated by the phase error compensator 14. The thus compensated output signal is inputted to the decision circuit 15 where decision is made on according to the combination of upper two bits of the phase difference data. A demodulated data is thus outputted from the decision circuit 15.

The phase error compensator 14 of FIG. 1 includes the phase error detector 16, the averager circuit 17 and the phase error compensating circuit 18.

The phase error detector 16 detects whether compensation by the phase error compensating circuit 18 is excessive or inadequate by comparing the demodulated data from the decision circuit 15 with the phase difference data after the phase compensation obtained from the phase error compensating circuit 18. The phase difference data is outputted to the averager circuit 17 for making the amount of error compensation suitable. In the averager circuit 17, the drastic variation of phase angle data such as due to noise is smoothed by, for example, moving average processes and is then inputted to the frequency error compensating circuit 18. The frequency error compensating circuit 18 is an adder.

Figure 4:
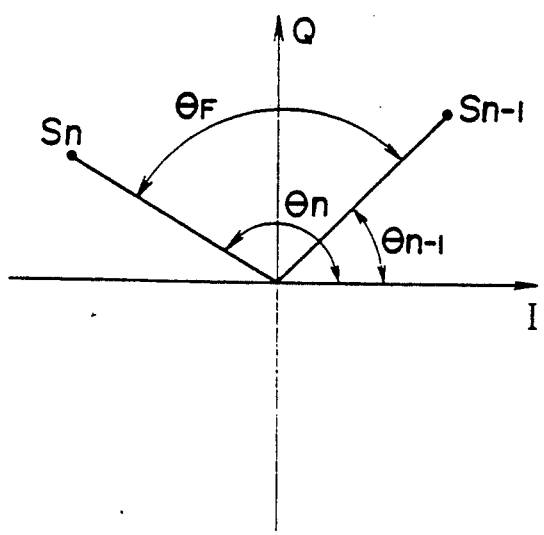
FIG. 4 is a diagram showing a phase angle on a complex plane, illustrating a differential-detecting operation of the demodulator.
Figure 5:
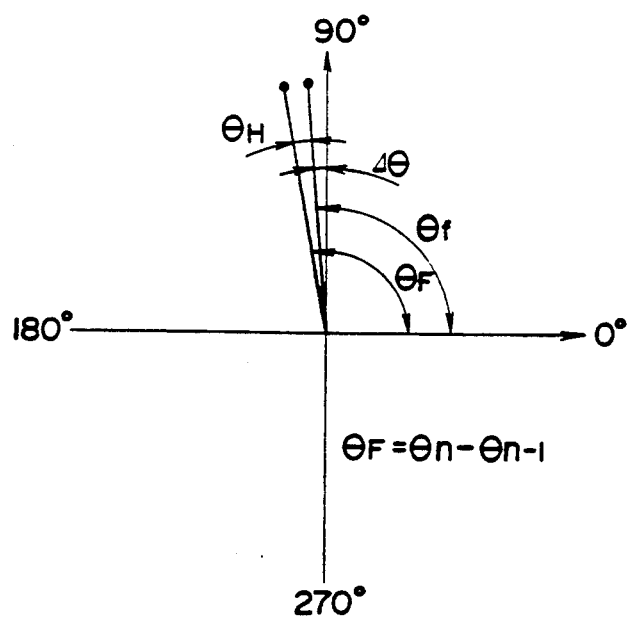
FIG. 5 is diagram showing an error compensating operation of the demodulator.

More specific description will now be made reffering to FIGS. 1, 4 and 5.

Assuming that (N−1)th symbol is outputted from the A-D converter 7 and its point on the complex plane is $S_{n-1}$ (FIG. 4), phase angle data $\theta_{n-1}$ is outputted from the phase angle processor 11 and inputted to both the subtracter 13 and the one-symbol delay circuit 12. The subtracter 13 calculates $(\theta_n - \theta_{n-1})$ by Modulo-360° and outputs the phase difference $\theta_F$. Since the phase difference $\theta_F$ includes an amount of angular movement of phase due to a phase error, the suitable amount of error compensation $\theta_H$ from the averager circuit 17 is applied to the phase error compensating circuit 18 in such a direction as to compensate this phase error.

The manner in which the suitable amount of error compensation $\theta_H$ occurs will now be described by taking the phase difference $\theta_F$ of FIG. 5 by way of illustrative example. The phase difference $\theta_F$ will be a phase difference $\theta_f$ by adding the suitable amount of error compensation $\theta_H$ by the phase error compensating circuit 18. This compensated phase difference $\theta_f$ is applied to both the input of the decision circuit 15 and one input of the phase error detector 16. To the other input of the phase error detector 16, the result of decision from the decision circuit 15 is inputted; in the case of FIG. 5, since $\theta_f \approx 90°$ in the embodiment, it will be (1, 0).

In the phase error detector 16, the phase difference between the compensated phase difference $\theta_f$ and 90 degrees calculated back from the digital signal (1, 0) from the decision circuit 15 is then inputted to the averager circuit 17. In the averager circuit 17, the drastic variation $\Delta \theta$ such as due to noise is smoothed by, for example, moving average processes and is then inputted to the phase error compensating circuit 18. In the decision circuit 15, the combination (I, Q) is outputted according to the phase difference from the phase error compensating circuit 18. In the case of FIG. 5, since $\theta_f \approx 90°(1, 0)$ is outputted.

Figure 6:
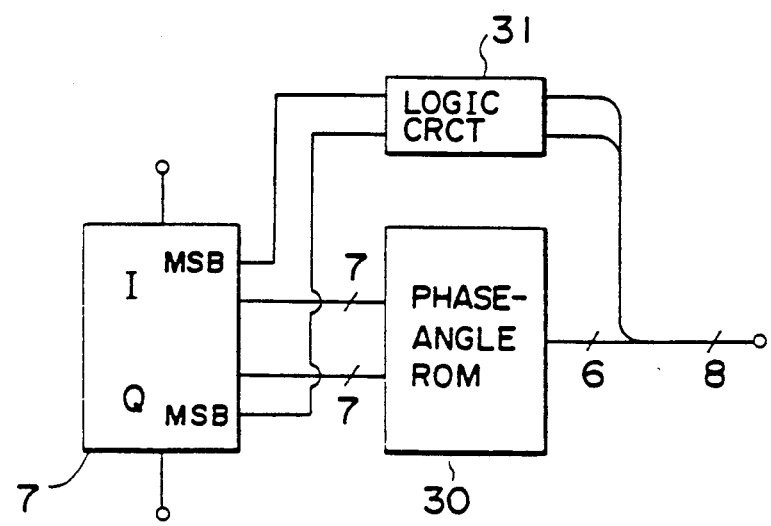
FIG. 6 is a detailed diagram showing a phase angle processor.

FIG. 6 shows a more detailed example of the phase angle processor 11. The output of the A-D converter 7 is outputted, as 8 bit signals, respectively to the I and Q-phase signals, and a phase angle is resulted by making an arithmetic operation of the I and Q-phase signals.

For this purpose, the phase angle processor 11 includes a phase-angle ROM 30 and a logic circuit 31 for determining the dimension. The I and Q-phase signals outputted from the A-D converter 7 are supplied to the logic circuit 31 so that MSB determines the dimension, and the lower 7 bits are supplied to the phase-angle ROM 30 as amplitude information of complex signals.

The phase-angle ROM 30 stores a reference data previously in such a manner that the phase angle signal $\theta$ of 6 bits will be outputted when I and Q-phase signals are inputted. The phase-angle data $\theta$ within the range of 0° to 90° is outputted depending on the lower 7 bit data of the I and Q-phase signals.

Figure 7:
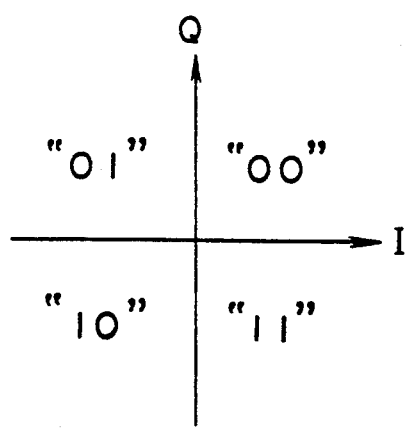
FIG. 7 is a diagram showing the phase angle processor outputs corresponding to the respective dimensions of FIG. 6.

Meanwhile, both MSB of the I and Q-phase signals are supplied to the logic circuit 31 in such a manner that dimensional data of FIG. 7 is outputted for each dimension on the complex plane, and as a result, the dimensional data according to the both MSB of the I and Q-phase signals are outputted in 2 bits from the logic circuit 31.

Then the phase angle data and the dimensional data are supplied, as 8-bit phase angle data, to the subtracter 13 and the delay circuit 12.

The subtracter 13 makes a differential arithmetic operation on both the N-th 8-bit signal and the (N−1)th 8-bit signal and outputs 8-bit phase difference signal $\theta_F$ to the phase error detector 14.

Consequently, the phase difference output $\theta_F$ from the subtracter 13 shows the phase angle difference between successive symbols so that an error between the carrier wave in the modulated signal created due to the demodulation of the quasi-base band and the local oscillatory frequency of the receiving side is compensated. The thus compensated phase difference signal $\theta_f$ is outputted to the decision circuit 15.

In the decision circuit 15, it is enough if the dimension of the phase difference signal, and as a result, only the upper 2 bits of the 8-bit phase difference signal $\theta_f$ is outputted to the output terminal B. Namely, it is unnecessary to discriminate a minute numerical value of the phase angle of the phase difference $\theta_f$, and it is possible to decide quadruphase signals only by an upper 2-bit signal indicating which dimension it belongs to.

In the illustrated embodiment, the 8-bit phase difference signals indicating about 0°, 90°, 180° and 270° are inputted. If an offset of +45° is added, then MSB will be the demodulated data Q, and MSB and 7th bits exclusive-ORed will be the demodulated data I.

This invention can be adopted in detecting an N-phase PSK modulated wave and $\pi/4$ shift QPSK modulated wave by selecting the threshold level of decision circuit 15.

According to this invention, partly since complex data is converted into phase angle data, and partly since the multi-phase PSK modulated wave is processed in the phase angle data mode, it is necessary for only an adder and a subtracter rather than a complex-multiplier, which is complicate in circuit construction, presenting the following advantages:

(1) The circuit construction is simplified. Specifically, since the customed or gate-arrayed size can be the ordinary 16-pin DIP-type IC, the circuit construction can be considerably simplified compared to the prior art.

(2) The cost of parts or elements is reduced.

(3) The entire circuit is reduced in size.

(4) The cost of production is reduced.

(5) The power consumption is reduced. Since only a single IC is used, the consumed power is several mW, compared with about 500 mW of the prior art circuit.

What is claimed is:

1. A circuit for demodulating a PSK modulated signal by differential-detection, comprising:
    (a) a pair of mixers for mixing the PSK modulated signal with a pair of locally oscillated signals of different phases to perform both frequency conversion to a quasibase band and complex separation;
    (b) a converter for converting the outputs of said mixers into a digital complex signal;
    (c) a phase angle processor for processing phase angles from said converted digital complex signal;
    (d) a differential-detector circuit for outputting phase difference data between successive symbols outputted from said phase angle processor;
    (e) a compensator for compensating a frequency error contained in said phase difference data; and
    (f) a decision circuit for outputting a demodulated signal from said compensated phase difference data.

2. A PSK signal demodulating circuit according to claim 1, wherein said phase angle processor includes a phase angle ROM in which said phase angle data corresponding to said digital complex signals are stored.

3. A PSK signal demodulating circuit according to claim 1, wherein said phase angle processor includes:

(a) a logic circuit for outputting dimensional data according to a MSB of said digital complex signals; and (b) a phase angle ROM in which predetermined phase angle data corresponding to a lower bit of said digital complex signal is stored.

4. A PSK signal demodulating circuit according to claim 1, wherein said compensator includes:

(a) a phase error detector for comparing a differential phase outputted from said the phase error compensator with a digital demodulated signal outputted from said decision circuit and for generating a phase error based on a result of this comparison; and (b) a phase error compensating circuit for compensating a differential phase angle according to the output of said phase error detector.

5. A PSK signal demodulating circuit according to claim 4, wherein said compensator further includes an averager circuit via which the output of said phase error detector is supplied to said phase error compensating circuit.

* * * * *